Patented June 19, 1928.

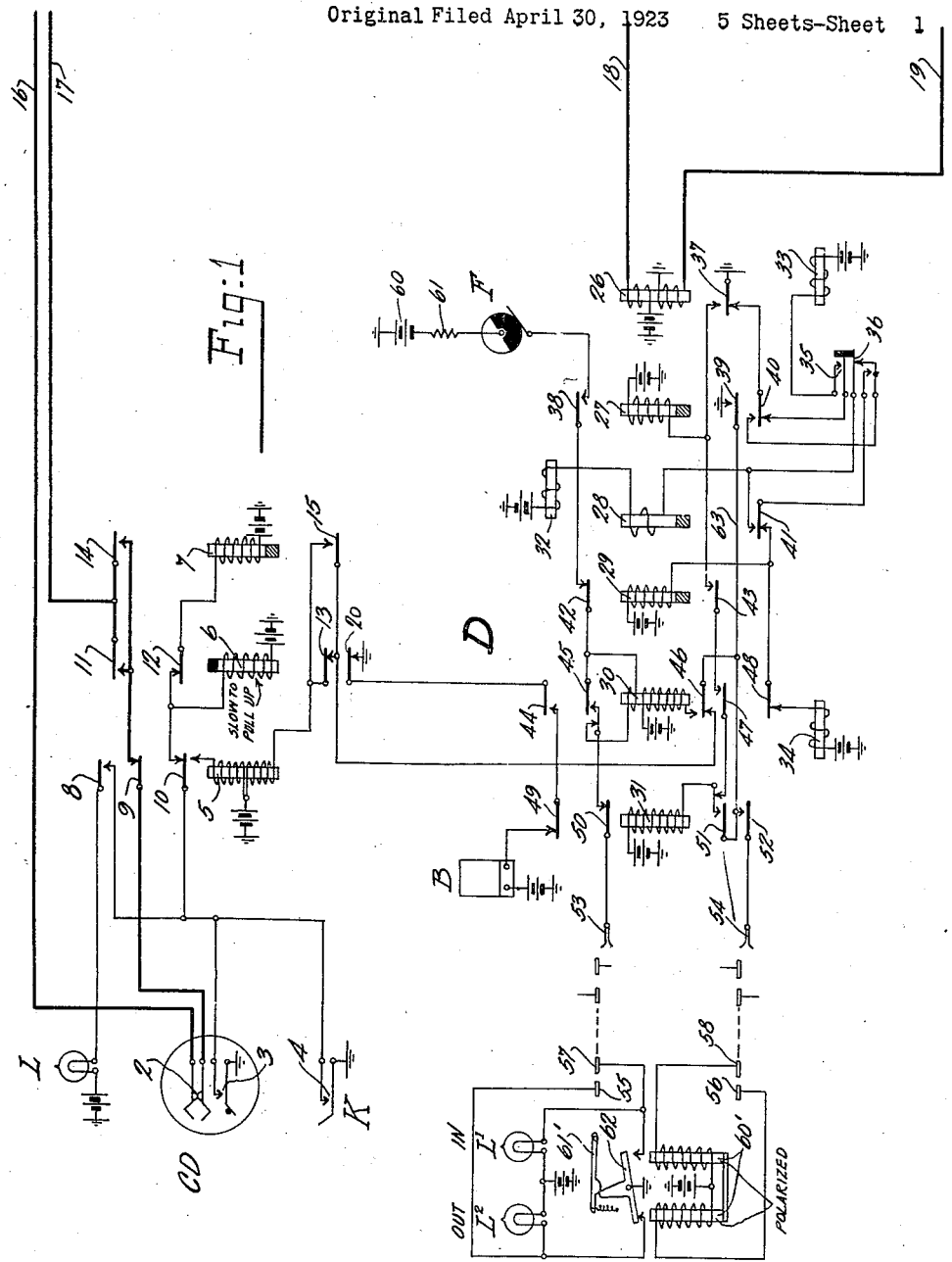

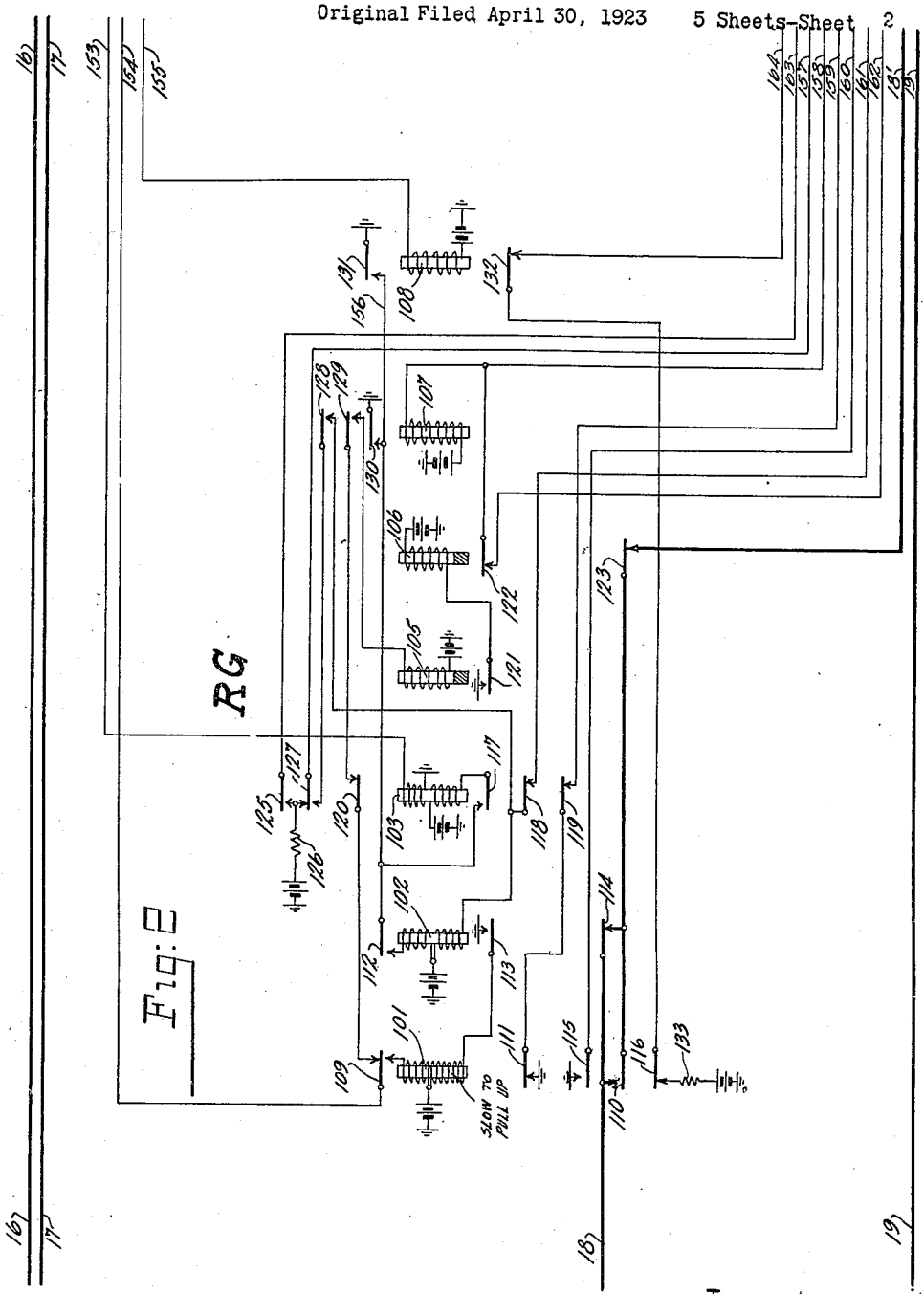

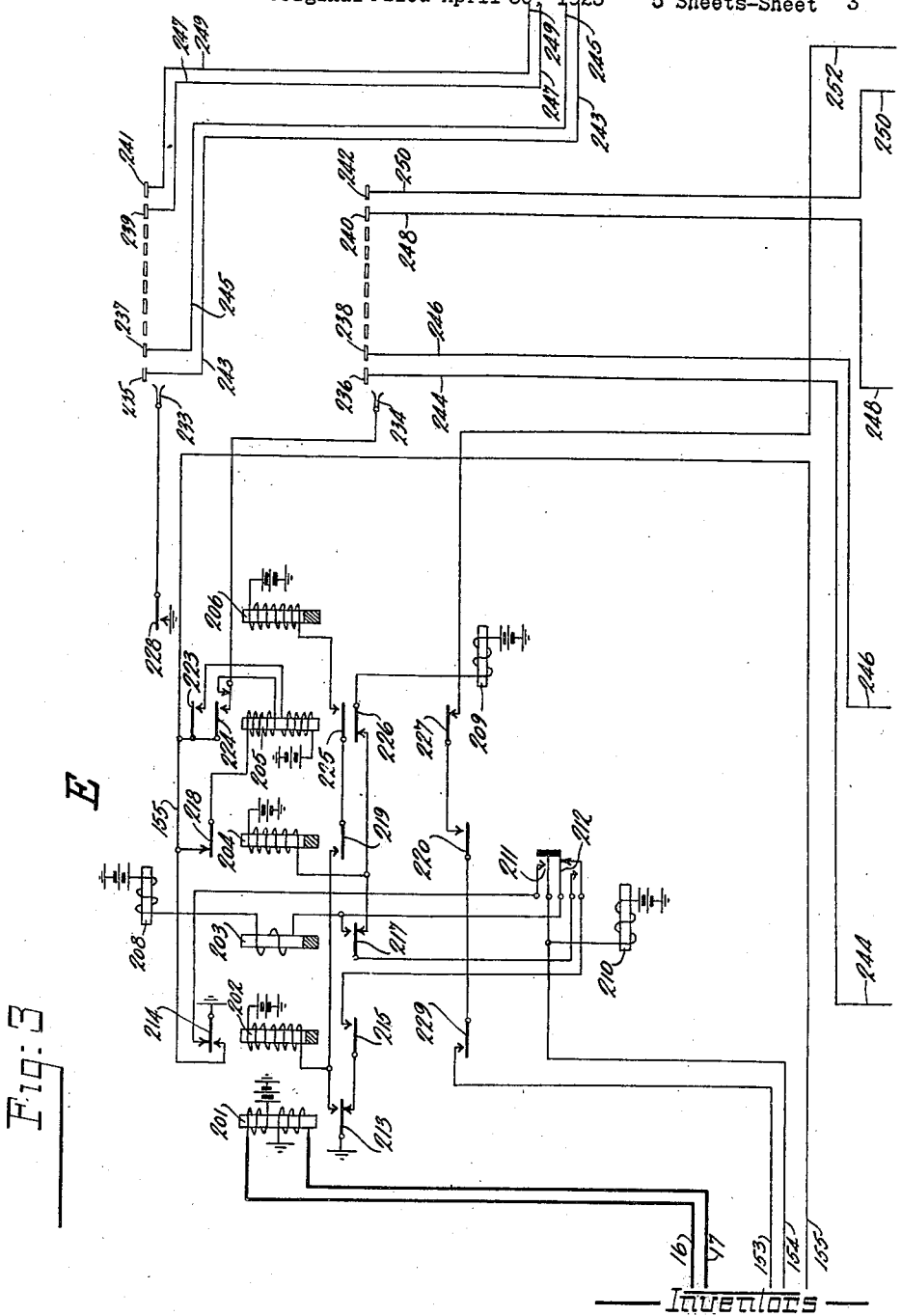

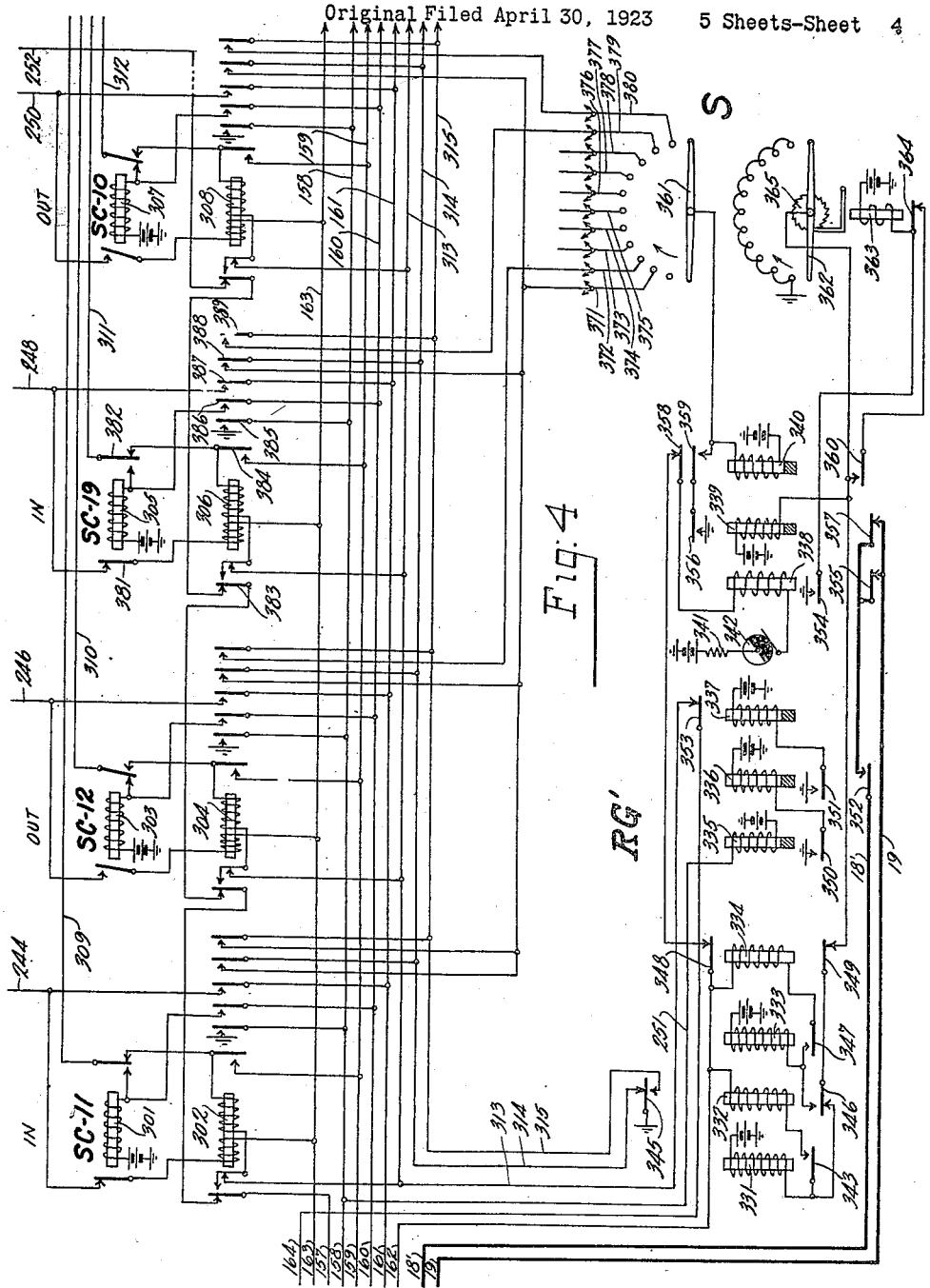

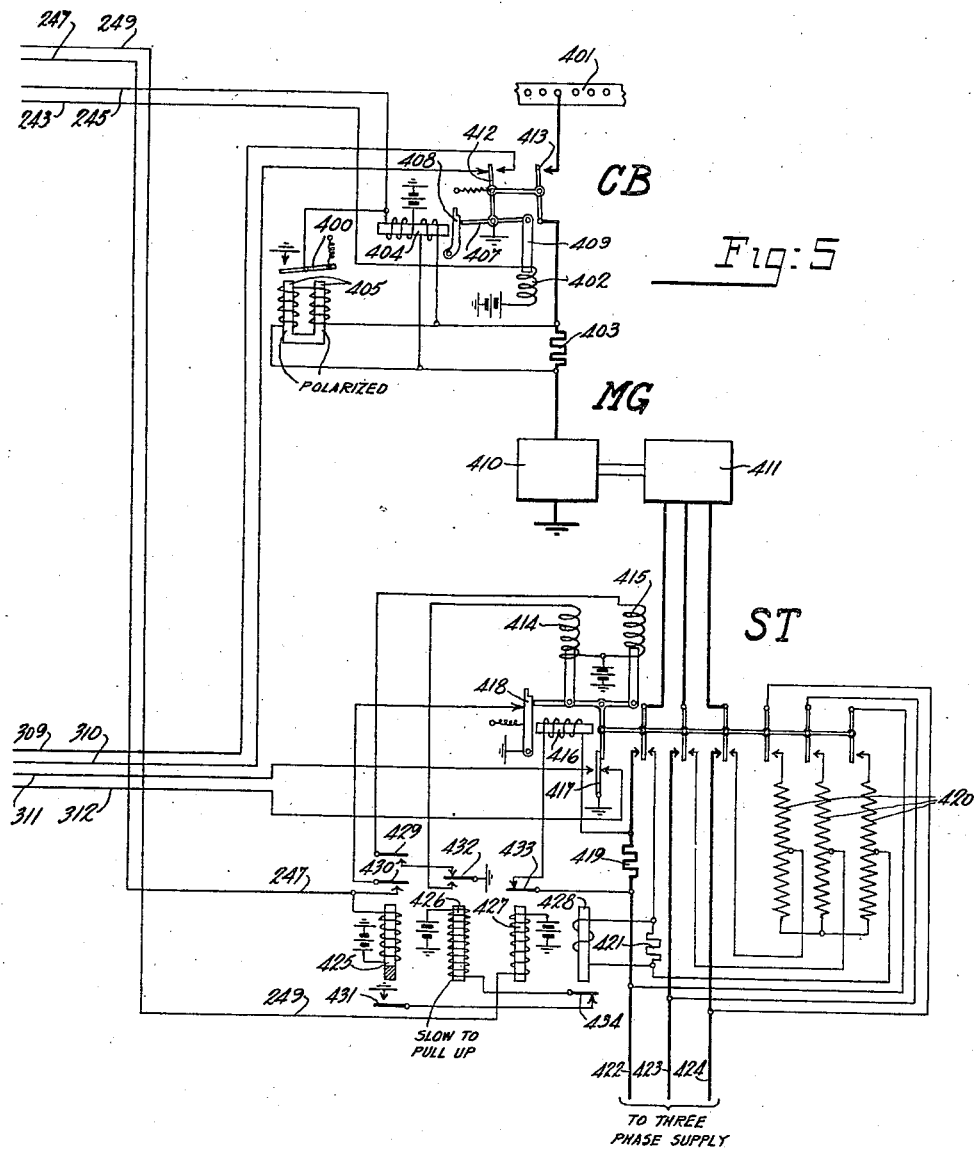

1,674,126

UNITED STATES PATENT OFFICE.

RODNEY G. RICHARDSON, OF CHICAGO, AND JOHN I. BELLAMY, OF BROOKFIELD, ILLINOIS, ASSIGNORS, BY MESNE ASSIGNMENTS, TO AUTOMATIC ELECTRIC INC., OF CHICAGO, ILLINOIS, A CORPORATION OF DELAWARE.

REMOTE CONTROL SYSTEM.

Application filed April 30, 1923, Serial No. 635,454. Renewed May 23, 1927.

The present invention relates to remote control systems in general, but is concerned more particularly with such remote control systems as are used by a despatcher to control from his office circuit breakers and the like which are located in a distant substation; and the principal object is the production of new and improved circuit arrangements whereby the operation of the system as a whole is improved and rendered less susceptible to error.

In order that the full utility of the present invention can be readily grasped, it may be pointed out that it has been proposed to control the circuit breakers, starters, etc., of a number of substations of, for example, a street railway power distributing system, from a single point, at which point a competent despatcher is located. Means are provided for keeping this despatcher informed at all times of the load requirements at each of the substations under his control. These means are not disclosed in this application, but are shown in the co-pending application of Nelson, Serial No. 515,664, filed Nov. 16, 1921, on which this case may be considered an improvement. The despatcher is, therefore, in a position to decide intelligently as to whether any particular machine in any one of the substations under his control should be in service or not. He is able to calculate this, not only from his knowledge of the total instant load at the substation in question, but also, from his general knowledge of the instant load at each of the other substations under his control. That is, since he is informed of the load at each of the substations, and since the various substations may be at his discretion interconnected by tie feeders, the despatcher gets a perspective view of the situation that he could not obtain from the knowledge of the load at a single substation, and can handle a load change in any substation as he sees fit, either starting or stopping a spare machine or connecting up or disconnecting one or more inter-substation tie feeders.

There are two circuits between the despatcher's office and each associated substation. One of these circuits is used by the despatcher for the purpose of controlling the substation switching apparatus, and the other is used to control the lighting and extinguishing of indicating lamps in the despatcher's office in accordance with the positions assumed by the various pieces of substation switching apparatus.

In a system of the above character, a piece of switching apparatus, a circuit breaker, for example, is thrown in or out by the despatcher through the medium of an automatic switch in the substation. The despatcher causes this switch to be positioned for the desired circuit breaker by means of his outgoing control circuit extending to the substation in which the circuit breaker in question is located, and when a circuit breaker is thrown in or out by the despatcher, or when it operates automatically due to an abnormal condition in the substation, the despatcher is notified by means of two lamps provided in the despatcher's office for that purpose and individual to that device. One of these lamps is called the "in" lamp and the other is called the "out" lamp, and when the circuit breaker goes in, the "out" lamp is extinguished and the "in" lamp is lit, and when the circuit breaker goes out, the "in" lamp is extinguished and the "out" lamp is lit. These lamps are controlled automatically by an automatic switch, which, in turn, is controlled from the substation over the despatcher's incoming control circuit.

It is obvious that in actual practice an automatic switch, such as the substation switch referred to above, cannot always be depended upon to arrive on the desired contact. The switch may fail to operate at all; it may fail to operate correctly; or the despatcher may set the switch on the wrong contact through an error such as is likely to occur from time to time. Since the above is true, it is desirable to provide means for informing the despatcher of the actual position of the substation switch before he performs the final act which is to operate the device for which the switch is set. It is, therefore, an object of the present invention to provide novel circuit arrangements for accomplishing this result. This result has been accomplished broadly before and is disclosed in the prior case of Richardson et al., Serial No. 628,723, filed March 30, 1923, on which this case may be considered an improvement.

The principal improvement over said prior case as regards this feature relates to the production of new and improved circuit arrangements whereby the despatcher's switch, which is operated automatically as a checking switch to check the setting of the substation switch when the despatcher operates the latter to throw a circuit breaker or other device in or out, is retained in its operated position until the circuit breaker or other device which it is desired to operate has been operated, at which time it operates to switch the circuits in accordance with the new setting of the operated device.

A further feature relates to the provision of suitable circuit arrangements whereby the despatcher may cause the release of the switch in his office after it has been operated as a checking switch and after the final act has been performed to operate a device, a starter, for example, and before the starter has completed its operation. This is done so as to prevent the tying up of the checking circuit for an undue length of time in case the starter requires a considerable amount of time for its operation.

There are various other features having to do with the detailed workings of the system which will appear fully hereinafter. Other improvements, disclosed in this application in connection with the above detailed description are shown merely to enable a clearer understanding of the invention. These improvements are claimed in the copending application of Bellamy, Serial No. 639,628, filed May 17, 1923.

Referring now the drawings which show a sufficient amount of equipment employed in a system of the character set forth above to enable the invention to be understood and its utility appreciated, Fig. 1 shows certain apparatus in the despatcher's office which is connected with one of the substations under his control by the two pairs of conductors 16 and 17 and 18 and 19; Figs. 2, 3, and 4 show controlling apparatus in the substation; and Fig. 5 shows a part of the power switching equipment in the substation.

Specifically, Fig. 1 shows the calling device CD by means of which the despatcher operates the control switch in the distant substation. This drawing shows also the lamp control switch D which is controlled from the substation to effect the lighting and extinguishing of the associated signal lamps, such as the lamps L' and L².

Figure 2 shows the relay group RG which is used for such purposes as will be described hereinafter.

Figure 3 shows the control switch E which is located in the substation and which is controlled by the despatcher over the conductors 16 and 17 by means of the calling device CD and the key K, Fig. 1.

Figure 4 shows the call sending equipment comprising the relay group RG' and the sending switch S. This drawing shows also four sending control relay sets SC—11, SC—12, SC—19, and SC—10, of which two are provided for each starter, circuit breaker, etc., in the substations. The sending control circuits SC—11 and SC—12 are associated with the circuit breaker CB, Fig. 5, whose "in" and "out" numbers are 11 and 12, respectively, and the sending control circuits SC—19 and SC—10 are associated with the starter ST, whose "in" and "out" numbers are 19 and 10, respectively. These sending control relays control the operation of the switch D, Fig. 1, through the medium of the relay group RG' and the sender S.

Figure 5 shows the motor generator MG which is operated from the three-phase alternating current supply through the starter ST and which supplies direct current to the substation bus-bar 401 by way of the circuit breaker CB.

The signal operating switch D, Fig. 1, and the switching equipment controlling switch E, Fig. 3, are mechanically identical with each other and are of the step-by-step vertical and rotary movement type of automatic switch disclosed in Automatic Telephony, second edition, a book written by Smith and Campbell and published by McGraw-Hill Book Company. A photograph of this type of switch is shown on page 53 of this publication and a skeleton drawing is shown on page 58. A description accompanies the photograph and sets forth how this type of switch operates. The circuits of the switches D and E, while similar to each other in certain respects, are somewhat different from each other and each will be described fully hereinafter.

The calling device CD, Fig. 1, may be of any one of several well-known types, but for the purpose of this application is assumed to be of the type shown on pages 40 and 41 of Automatic Telephony above referred to. The function of this calling device, as stated hereinbefore, is to control the switch E in the substation over the conductors 16 and 17.

The sending switch S, Fig. 4, comprises two semi-circular rows of contacts which are wiped over by the wipers 361 and 362 under the control of the stepping magnet 363. These wipers are operated step by step as the stepping magnet 363 is alternately energized and deenergized, being advanced upon the deenergization of stepping magnet 363 rather than upon its energization. One mechanical embodiment of such a switch is shown on page 51 of Automatic Telephony referred to above.

In view of the fact that substations and their equipment are well-known in the art, no attempt has been made to show the substation layout in any great detail, only so much being shown as will be needed to describe and explain the various features of the present invention. It is to be understood, however, that, although the starter ST and the circuit breaker CB, Fig. 5, are the only pieces of substation switching equipment shown, in actual practice a great many more similar devices will be found in each substation. It is, therefore, assumed that there are several other switching devices in the substation. That being the case, each of these switching units has its own sending control relays, such as the sending control relays SC—11 and SC—12, Fig. 4. These sending control relays are interconnected with the ones shown by the band of conductors terminating in arrowheads at the right-hand edge of Fig. 4, and by the locking chain circuit extending through contacts on the relays 302, 304, 306, and 308 and which is dotted to the right of relay 308 and extended to the conductor 252 which is assumed to be connected at the end of the chain.

It is to be understood, of course, that in practice it is only necessary to have one battery in the substation and one battery in the despatcher's office to supply current for the remote control system, and that the several batteries are shown only for the sake of simplicity.

The apparatus having been described in a more or less general manner, its operation will now be taken up in detail. For this purpose it will be assumed that the despatcher decides to put the motor generator MG in the substation into operation. In order to do so the despatcher must first bring about the operation of the starter ST. Accordingly, the despatcher operates the circuit closing key K associated with the calling device CD, Fig. 1, thereby closing a circuit for the slow to pull up relay 6 at the contacts 4. This relay is made slow to pull up in addition to being slow to fall back by placing the copper collar on the armature end of the core rather than on the opposite end. This is denoted by the position of the copper collar on the upper end of relay 6 which is assumed to be the armature end. To proceed with the description of the operation, relay 6, being slow to pull up, does not pull up for the time being, and relay 7 energizes in multiple with relay 6 through the resting contact of armature 12 and said armature. Upon energizing, relay 7 closes a bridge across conductors 16 and 17 at armature 14. This bridge, it will be noted, includes the interrupter contacts 2 of the calling device CD. A moment later the relay 6 energizes and places a shunt around armature 14 and its working contact at armature 11 and at armature 12 disconnects relay 7, whereupon relay 7 deenergizes.

In the substation line relay 201 of the switch E energizes over conductors 16 and 17 in response to the above mentioned bridge being placed across these conductors in the despatcher's office, and at armature 213 closes a circuit for the slow-acting release relay 202, whereupon relay 202 energizes; prepares a circuit for vertical magnet 208 at armature 215; and at armature 214 opens a point in the circuit of release magnet 210 and places ground on the locking conductor 155, thereby closing a circuit for release relay 108, Fig. 2. Relay 108 now energizes; places ground on the locking conductor 156 at armature 131; and removes battery from the pick-up conductor 164 at armature 132 so as to remove the sending control relays SC—11, etc. from the control of the associated devices, such as the circuit breaker CB, Fig. 5, until after the despatcher has completed the desired operation.

The despatcher now operates the calling device CD in accordance with the first digit 1 of the "in" number 19 assigned to the starter ST, thereby producing one interruption in the bridge across conductors 16 and 17 at the interrupter contacts 2. When this occurs, line relay 201 deenergizes once momentarily, opens the circuit of the slow-acting release relay 202 at armature 213, and closes a circuit for vertical magnet 208 as follows: From ground by way of armature 213 and its resting contact, armature 215 and its working contact, contact of off-normal spring 212 and said spring, slow-acting series relay 203, and vertical magnet 208 to battery. Release relay 202, being slow-acting, does not deenergize at this time and vertical magnet 208 energizes over the above traced circuit and raises the wipers 233 and 234 opposite the first level of their associated bank contacts. The slow-acting series relay 203 is energized in series with the vertical magnet 208 and is made slow-acting in order to enable it to retain its armature attracted throughout a series of several impulses in case the wipers 233 and 234 are to be raised to some level other than the first. Upon energizing, relay 203 opens a point in the circuit of rotary magnet 209 at the resting contact of armature 217, and at the working contact of armature 217 closes a circuit for itself and for vertical magnet 208 which is effective after the off-normal springs 211 and 212 have shifted as they do on the first vertical step. A moment after the impulse of current has died away, the slow-acting relay 203 deenergizes and shifts the operating circuit from the vertical to the rotary magnet.

The despatcher now manipulates the calling device CD in accordance with the second digit 9 in the "in" number 19, thereby producing nine interruptions in the circuit of line relay 201 of the switch E. Each time line relay 201 deenergizes in response to one of these interruptions, it closes a circuit for rotary magnet 209 as follows: from ground by way of armature 213 and its resting contact, armature 215 and its working contact, normally open contacts controlled by off-normal spring 212, armature 217 and its resting contact, resting contact of armature 226 and said armature, and rotary magnet 209 to battery. By the operation of rotary magnet 209 the wipers 233 and 234 are rotated step by step into engagement with the ninth set of bank contacts 239 and 240 in the first level. Relay 204 is energized in multiple with rotary magnet 209 and, being slow-acting, retains its armatures attracted throughout the rotary movement, thereby maintaining the upper winding of switching relay 205 disconnected at armature 218. As a further result of the energization of relay 204, it closes a circuit for the discriminating relay 103 of the relay group RG, Fig. 2, as follows: from ground by way of the upper winding of relay 103, conductor 153, working contact of armature 229 and said armature, armature 220 of relay 204 and its working contact, conductor 252, the chain of contacts carried by relays 308, 306, etc., Fig. 4, conductor 157, armature 127 and its resting contact, and resistance 126 to battery. Upon energizing, relay 103 locks its lower winding to the grounded locking conductor 156 at armature 117; places battery on conductor 163 at armature 125; disconnects the lower winding of relay 102 from conductor 161 at armature 118; and at armature 127 disconnects the locking chain conductor 157 from the resistance 126, and connects it to the lower winding of relay 102 for a reason which will be seen subsequently.

At the end of the rotary movement, slow-acting relay 204 deenergizes; opens the circuit of the upper winding of discriminating relay 103 at armature 220, leaving relay 103 locked up by means of its lower winding; and at armature 218 connects up the upper winding of switching relay 205, thereby completing the circuit of the upper winding of relay 205 as follows: from ground by way of the grounded locking conductor 155, resting contact of armature 218 and said armature, upper winding of relay 205, normally closed contacts controlled by armature 224, wiper 234, bank contact 240, conductor 248, resting contact of armature 381 and said armature, left-hand winding of relay 306, conductor 163, armature 125 and its working contact, and resistance 126 to battery. Relays 205 and 306 energize in series over the above traced circuit and relay 205, upon energizing, closes a locking circuit for its lower winding at armature 223, connects the grounded locking conductor 155 directly to the wiper 234 and disconnects its own upper winding at armature 224, prepares a circuit for relay 206 at armature 225, disconnects the rotary magnet 209 at armature 226 so as to prevent the rotary magnet from energizing again when the despatcher releases the control circuit, and at armature 227 opens another point in the circuit of relay 103.

Relay 306 in the sending control circuit SC—19, upon energizing over the above traced circuit, shifts the circuit of its right-hand winding at armatures 383 and 384 (without utility at this time); prepares a circuit for cut-off relay 305 at armature 386; connects the first and ninth impulse stop conductors 371 and 379, respectively, of the sender S to the first and second digit stop conductors 314 and 315 at armatures 388 and 389, respectively; and at armature 385 places ground on start conductor 158, thereby closing a circuit for relay 107 in the relay group RG. Relay 107, upon energizing, places a multiple ground on the local locking conductor 156 at armature 130, and at armature 128 prepares a circuit for relay 102. Relay 335 in the relay group RG' is also energized over start conductor 158 and closes a circuit for relay 336 at armature 350, which relay, in turn, energizes and closes a circuit for relay 337 at armature 351. Relay 337, upon energizing, at armature 353 opens a further point in the battery circuit of relays 302–308, inclusive. As a further result of the energization of the slow-acting relay 336, it places a bridge across conductors 18' and 19 at armature 352. Since conductor 18' is connected with the despatcher's incoming control conductor 18 through the resting contact of armature 123 and said armature of the relay group RG, Fig. 2, and through the resting contact of armature 114 and said armature, a bridge is now complete across conductors 18 and 19, and line relay 26 of the switch D in the despatcher's office accordingly energizes and closes a circuit for release relay 27 at armature 37. Release relay 27, upon energizing, places ground on the locking conductor 63 at armature 39, and at armature 40 opens a point in the circuit of release magnet 33 and prepares a circuit for vertical magnet 32. The switch D is now ready to be operated to check the position of the switch E before the despatcher performs the final act to operate the starter ST.

In the substation, as a further result of the ground potential being placed on start conductor 158, a circuit is closed for sending relay 338, Fig. 4, as follows: from ground by way of start conductor 158, armature 122 of relay 106, Fig. 2, and its resting contact, conductor 162, armature 348 and its resting contact, resting contact of armature 358 and said armature, sending relay 338, interrupter 342, and the resistance 341 to battery. As a result, relay 338 commences to vibrate under the control of the interrupter 342. Upon the first effective energization of relay 338, a circuit is closed at armature 354 for stepping magnet 363 of the sender S. Upon energizing, magnet 363 attracts its armature, thereby moving the associated pawl into engagement with the next notch in the wiper driving ratchet wheel 365. The wipers 361 and 362, however, are not moved at this time. Upon the subsequent deenergization of sending relay 338, magnet 363 deenergizes and the wipers 361 and 362 are accordingly advanced into engagement with the first set of associated bank contacts. Upon wiper 362 engaging the first bank contact, a circuit is closed for pick-up relay 339. Upon energizing, pick-up relay 339 prepares a locking circuit for stop relay 340 at armature 356, and at armature 357 removes the shunt from around armature 355 and its resting contact. As a further result of wiper 362 engaging the first bank contact, a circuit is closed for relay 331 in multiple with relay 339. Relay 331, upon energizing, closes a locking circuit for itself including relay 332 at armature 343. Relay 332 does not energize at this time on account of the fact that it is short-circuited.

With the shunt removed from around armature 355 of sending relay 338 at armature 357, the next energization of stepping relay 338 results in the circuit of line relay 26 of the switch D being opened at armature 355, in addition to the circuit of stepping magnet 363 being closed.

When stepping relay 338 deenergizes again, the circuit of line relay 26 of the switch D is again closed and the wipers 361 and 362 are advanced into engagement with the second set of associated bank contacts. When wiper 361 comes into engagement with its second bank contact, a circuit is closed for stop relay 340 as follows: from ground by way of armature 345 of relay 332 and its resting contact, first digit stop conductor 314, armature 388 and its working contact, first impulse stop conductor 371, wiper 361, and stop relay 340 to battery. Upon energizing, stop relay 340 disconnects the sending relay 338 at armature 358, while the said relay 338 is still deenergized; completes its locking circuit at armature 359; and at armature 360 connects the wiper 362 with stepping magnet 363 through its local interrupter contacts 364. The first digit 1 in the desired number has now been transmitted and the wipers 361 and 362 of the sender S are advanced step by step in a forward direction by the buzzer-like action of stepping magnet 363 which interrupts its own circuit at contacts 364 until their movement is arrested in response to the wiper 362 passing off the last grounded bank contact. The passing of wiper 362 off the last grounded bank contact results also in the circuit of relay 339 and the initial circuit of relay 331 being opened. When this occurs, relay 332 is no longer short circuited and immediately energizes in series with relay 331 from ground supplied over the grounded conductor 162. Upon energizing, relay 332 opens a further point in the initial circuit of relay 331 and prepares a circuit for relay 333 at armature 346, and at armature 345 removes ground from the first digit stop conductor 314 and places ground on the second digit stop conductor 315.

After an interval, the slow-acting pick-up relay 339 deenergizes; replaces the shunt around armature 355 and its resting contact at armature 357; and at armature 356 opens the locking circuit of the slow-acting stop relay 340, which relay deenergizes after an interval and connects up the sending relay 338 again. The interval required for the relays 339 and 340 to fall back one after the other is utilized in the switch D to effect the switchover from the vertical to the rotary operation.

When the sending relay 338 starts to vibrate again, the above operations are repeated by the sender S under the control of the sending relay 338. The pick-up relay 339 energizes on the first movement of the switch wipers and each energization of relay 338 thereafter results in the circuit of line relay 26 being opened at armature 355. This continues until wiper 361 arrives upon the bank contact in which the ninth impulse stop conductor 379 terminates, at which time the nine impulses in the second digit 9 of the desired number have been transmitted. When this occurs, stop relay 340 energizes over the second digit stop conductor 315 which is connected to the ninth impulse stop conductor 379 at armature 389 and its working contact. The energization of relay 340 at this time results in the wipers 361 and 362 being again restored to normal.

As mentioned above, a circuit is prepared at armature 346 for relay 333 at the end of the first digit and, consequently, upon the energization of pick-up relay 339 at the beginning of the second digit 9, which was sent out as described above, relay 333 energizes and closes a circuit for relay 334. Then, when wiper 362 is returned to its normal position, the short-circuit is removed from around relay 334, whereupon relay 334 energizes in series with relay 333 and disconnects relay 333 from in multiple with relay 339 at armature 349, and at armature 348 opens a further point in the circuit of sending relay 338 so as to prevent the said relay 338 from operating again when it is connected up at armature 358 upon the deenergization of stop relay 340 which occurs subsequently.

In the despatcher's office, line relay 26, upon deenergizing in response to the one interruption representing the first digit 1, produced in its circuit as described above, closes a circuit for vertical magnet 32 as follows: from ground by way of armature 37 and its resting contact, armature 40 and its working contact, contact of off normal spring 36 and said spring, slow-acting series relay 28, and vertical magnet 32 to battery. By the operation of vertical magnet 32, the wipers 53 and 54 of the switch D are raised opposite the first level of bank contacts and, by the combined operation of slow-acting relay 28 and the make before break off normal combination controlled by off normal spring 36, the operating circuit is shifted from the vertical magnet 32 to the rotary magnet 34 upon the deenergization of slow-acting relay 28 after the termination of the single impulse delivered to vertical magnet 32.

In response to each of the nine interruptions produced in its circuit for the second digit 9 in the desired number, line relay 26 deenergizes and closes a circuit for rotary magnet 34 as follows: from ground by way of armature 37 and its resting contact, armature 40 and its working contact, normally open contacts controlled by off normal spring 36, armature 41 and its resting contact, armature 48 and its resting contact, and rotary magnet 34 to battery. By the operation of rotary magnet 34 in response to the nine impulses of current received over the above circuit, the wipers 53 and 54 are rotated into engagement with the ninth set of bank contacts 57 and 58 in the first level. The slow-acting relay 29 is energized in multiple with rotary magnet 34 and maintains the upper winding of switching relay 30 disconnected during the rotary movement. Upon the termination of the rotary movement, slow-acting relay 29 deenergizes and completes a circuit for the lamp L' and the upper winding of switching relay 30 as follows: From ground by way of the booster battery 60, resistance 61, the flasher F, working contact of armature 38 and said armature, resting contact of armature 42 and said armature, upper winding of switching relay 30, normally closed contacts controlled by armature 45, resting contact of armature 50 and said armature, wiper 53, bank contact 57, and the lamp L' to battery. The booster battery 60 is poled in such a way as to assist the exchange battery. The lamp L' does not receive too much current, however, owing to the limiting effect of the resistance 61. The reason the booster battery is included in the circuit of the flasher F is to provide a circuit for relay 30 when wiper 53 lands on a grounded bank contact as will be pointed out hereinafter. Upon energizing over this circuit, relay 30 opens a further point in the circuit of the lower winding of relay 5 associated with the calling device CD, and closes a locking circuit for its own winding at armature 46; disconnects the rotary magnet 34 at armature 48, so as to prevent its further operation; first short circuits and then disconnects its own upper winding at armature 45; and at armature 47 prepares a circuit for relay 31. The lamp L' now flashes on and off under the control of the flasher F and informs the despatcher of the position of the switch E in the substation.

The despatcher having noted the position of the switch E as indicated by the flashing of the lamp L', now performs the final act necessary to operate the starter ST. This act consists in again operating the calling device CD for any desired digit, the digit 1 for example. When line relay 201 of the switch E deenergizes in response to this operation, it closes a circuit for the slow-acting relay 204 at armature 213. Relay 204, upon energizing, connects relay 206 in multiple with release relay 202 at armature 219 through the working contact of armature 225 and said armature. Then, when relay 201 energizes again, relay 206 is energized in multiple with release relay 202 and places ground on wiper 233, thereby sending an impulse of current through bank contact 239 and conductor 247 to relay 425 of the starter ST. Relay 204 of the switch E soon falls back and disconnects relay 206 at armature 219. Relay 206 then falls back after the interval for which it is adjusted and terminates the impulse being delivered to relay 425. Relay 425, upon energizing, closes a locking circuit for itself at armature 430, and at armature 431 closes a circuit for the slow to pull up relay 426 by way of the resting contact of armature 434 and said armature. Relay 426 is slow to pull up on account of its highly inductive winding, which has many turns, and its stiff adjustment, and for this reason does not operate immediately. As a further result of the energization of relay 425, it closes at armature 429 a circuit for the solenoid 415. Solenoid 415, upon becoming energized, attracts the associated plunger, with the result that the switch levers of the starter are swung to the right and the auto-transformer 420 is connected up, and the leads extending to the motor 411 are connected to the low voltage taps of the auto-transformer. When the motor 411 is first connected up, the initial inrush of current is sufficient to operate the relay 428 which is shunted around the resistance 421. Relay 428 accordingly energizes and opens the circuit of the slow to pull up relay 426 before the latter has had time to operate. The circuits remain in this condition until the motor 411 has approximately reached its running speed.

The despatcher may either release the key K immediately after having given the calling device CD its initial operation or he may hold the key K operated so as to receive the indication of the starter ST as soon as the operation is completed. It will be assumed at this time that he does the latter.

After the motor 411 has reached a speed which approximates its running speed, the current intake falls to such a value that the relay 428 is no longer able to maintain its armature 434 attracted and, accordingly, falls back and closes a circuit for relay 426. Relay 426, upon energizing, opens the circuit of solenoid 415 and closes a circuit for solenoid 414. When this occurs, the switch levers of the starter are swung to the left and the leads of the motor 411 are connected to the supply leads 422–424, inclusive. The holding magnet 416 is now energized in multiple with the resistance 419 and attracts the armature 418 so as to retain the switch levers in their operated position. Armature 418, upon becoming attracted, opens the locking circuit of relay 425, whereupon relay 425 deenergizes and opens the circuit of relay 426 at armature 431. Relay 426 thereupon deenergizes and opens the circuit of solenoid 414, leaving the switch levers under the control of the locking armature 418.

As a further result of the switch levers of the starter ST being thrown into running position, the lever 417 is moved to the left and shifts the ground connection from conductor 312 to conductor 311. In response to ground being removed from conductor 312, the cut-off relay 307 of the sending control circuit SC—10 deenergizes, and in response to ground being placed on conductor 311, a circuit is closed through the right-hand winding of the already energized relay 306 of the sending control circuit SC—19 as follows: from ground by way of the lever 417 of the starter ST, conductor 311, armature 382 and its resting contact, righthand winding of relay 306, working contact of armature 383 and said armature, normally closed contacts controlled by relays 304 and 302, conductor 157, armature 127 and its working contact, armature 128 and its working contact, and the lower winding of relay 102 to battery. Since relay 306 of the sending control circuit SC—19 is already energized, the closing of this circuit does not produce any effect on that relay. Relay 102, however, energizes over this circuit and closes at armature 112 a locking circuit for its upper winding from the grounded locking conductor 156. As a further result of the energization of relay 102, it opens the circuit of line relay 26 of the switch D at armature 114, and at armature 113 closes a circuit for the slow to pull up relay 101. This relay is similar to relay 426 of the starter ST and is so designed and adjusted that it does not pull up immediately.

A moment later, the slow to pull up relay 101 energizes; prepares a locking circuit for its upper winding at armature 109; places ground on conductor 160 at armature 115; and at armature 110 terminates the interruption being produced in the circuit of line relay 26 of the switch D.

In the despatcher's office line relay 26 is deenergized momentarily in response to the above mentioned momentary interruption produced in its circuit by the conjoined action of relays 102 and 101 of the relay group RG, and closes at armature 37 a circuit for the slow-acting relay 29. Relay 29, upon energizing, prepares a circuit for the wiper switching relay 31 at armature 43. When relay 26 energizes after its momentary deenergization, the circuit of slow-acting relay 29 is opened, but before the slow-acting relay 29 has had time to deenergize, a circuit is completed for relay 31 as follows: from ground by way of armature 37 and its working contact, working contact of armature 43 and said armature, working contact of armature 47 and said armature, normally closed contacts controlled by armature 51, and relay 31 to battery. Relay 31, upon energizing, closes a locking circuit for itself traceable from ground, through armature 39 and its make contact, conductor 62, armature 51 and its make contact, through relay 31 to grounded negative battery, and opens its initial circuit at armature 51; disconnects the wiper 53 at armature 50, thereby stopping the lamp L' from flashing; and at armature 52 places ground on wiper 54, thereby closing a circuit for the right-hand coil of the polarized relay 60', which coil is wound in such a direction as to cause the armature 62 to be tilted to the position opposite to that shown in the drawing, thereby opening the circuit of the lamp L² and closing a circuit for the lamp L'. The lamp L² now becomes extinguished and the lamp L' is lighted steadily, thus informing the despatcher that the starter ST has finally been thrown into running position.

In the substation as a still further result of the energization of relay 101, Fig. 2, it places ground on cut-off conductor 160, thereby closing a circuit for cut-off relay 305 of the sending control circuit SC—19 by way of armature 386 of relay 306 and its working contact. Cut-off relay 305 thereupon energizes and opens the circuit of both windings of relay 306 at armatures 381 and 382, and at armature 382 locks itself to conductor 311. Relay 306 now deenergizes and removes ground from start conductor 158 at armature 385, whereupon relay 107 in the relay group RG, Fig. 2, and relays 331–334, inclusive, of the relay group RG', Fig. 4, deenergize. Relay 107, upon deenergizing, removes ground at one point from the locking conductor 156, leaving said conductor grounded by relay 108 at armature 131. As a still further result of the ground potential being removed from start conductor 158, the circuit of the slow-acting relay 335 of the relay group RG' is opened and, after an interval, relay 335 deenergizes and opens the circuit of relay 336 at armature 350. After another slight interval, relay 336 also deenergizes and opens the circuit of relay 337 at armature 351, and at armature 352 opens the bridge across the conductors 18' and 19, so as to bring about the release of the switch D in a manner to be described hereinafter. The time required for the relays 335 and 336 to fall back one after the other is utilized in the switch D to effect the connecting up of the wiper 53 and the operation of the signal 60' after the final momentary interruption has been produced in the circuit of line relay 26 as described above. After an interval which is sufficiently long to permit the switch D to release, the slow-acting relay 337 deenergizes and closes at armature 353 a point in the chain circuit which includes conductors 162 and 313.

The release of the switch D will now be described. When line relay 26 deenergizes in response to its circuit being opened by relay 336 of the relay group RG', it falls back and closes a circuit for the slow-acting relay 29, which relay accordingly energizes, but for no useful purpose at this time. After an interval the slow-acting release relay 27 deenergizes; disconnects the flasher F at armature 38; removes ground from the locking conductor 63 at armature 39, thereby opening the circuit of the relays 30 and 31 which accordingly deenergize. The removal of ground from wiper 54 results in the circuit of the right-hand winding of relay 60' being opened. The armature 62 is retained in its set position, however, by the locking arm 61'. As a further result of the deenergization of relay 27, it opens at armature 40 the circuit of the slow-acting relay 29 and closes a circuit for release magnet 33. Release magnet 33, upon energizing, restores the wipers 53 and 54 to their normal position, whereupon the circuit of release magnet 33 is opened at off normal contacts 35 by the switch shaft.

The despatcher after noting that the starter ST has finally been thrown into running position, restores the key K to normal, thereby opening the circuit of the slow-acting relay 6. Relay 6, upon deenergizing after an interval, opens the circuit of line relay 201 of the switch E at armature 11, whereupon line relay 201 deenergizes and opens the circuit of release relay 202. The release relay 202 deenergizes after an interval and removes ground from the locking conductor 155 and closes a circuit for release magnet 210 at armature 214. Switching relay 205 of the switch E and relay 108 of the relay group RG both deenergize in response to the removal of the ground potential from conductor 155. Release magnet 210 now energizes and restores the shaft and wipers of the switch E to normal, whereupon the circuit of release magnet 210 is opened at off normal contacts 211. Relay 108, upon deenergizing, removes ground from locking conductor 156 at armature 131, thereby permitting relays 102 and 103 to deenergize. Relay 102, upon deenergizing, opens the circuit of the lower winding of relay 101, whereupon relay 101 deenergizes and replaces battery on the pick-up lead 164 and armature 116.

It was assumed before that the despatcher held the circuit of line relay 201 closed at the key K and waited with the connection of the switch set up for the starter ST to operate, so as to receive the check signal as soon as possible. It will now be assumed that the despatcher has operated the switch E, as hereinbefore described, up to and including the last turn of the calling device CD, which resulted in the starter ST being operated, and that the despatcher does not wait for the starter ST to be thrown in, but releases the key K immediately after having operated the calling device CD. In this case, when the despatcher releases the switch E, the switch D is still in its operated position and ground is still on the start conductor 158, with the result that the several relays held energized from the said start conductor 158 are still up. It will be remembered also that the relay 306 is in its energized condition and that cut-off relay 305 has not yet been operated. With these facts again in mind the operation will now be taken up. Assuming that the key K is released before the calling device CD has reached its normal position after the last operation, the circuit of the holding relay 6 remains closed at the off normal contacts 3 of the dial until the latter returns to its normal position and, when this occurs, the circuit of the slow-acting relay 6 is opened, and after an interval which is sufficiently long to permit the switch E to function and thereby place ground on the wiper 233, as described hereinbefore, the relay 6 deenergizes and opens the circuit of line relay 201. Line relay 201, upon deenergizing, opens the circuit of release relay 202. Release relay 202 now deenergizes and at armature 214 disconnects ground from the locking conductor 155 and closes a circuit for release magnet 210 through the off normal contacts 211. The wipers 233 and 234 are now restored to their normal position by release magnet 210, whereupon the circuit of release magnet 210 is opened at off normal contacts 211 by the switch shaft when it reaches its normal position. In response to the ground potential being removed from conductor 155, switching relay 205 of the switch E and relay 108 of the relay group RG deenergize. Relay 108, upon deenergizing, removes ground at one point from conductor 156, leaving said conductor 156 grounded by relay 107 at armature 130.

As a further result of a removal of ground from conductor 155 by release relay 202 of the switch E, the circuit of relay 306 is opened and it deenergizes. Upon deenergizing, relay 306 removes ground from start conductor 158 at armature 385, whereupon the various associated relays fall back and the connection set up through the switch D in the despatcher's office is released in the hereinbefore described manner. Discriminating relay 103 deenergizes at this time in response to the removal of ground from conductor 156 by relay 107 at armature 130.
The circuits associated with the switch E and the sender are now at normal and the sender circuits are ready to respond as soon as the starter ST has completed its operation.
When the starter ST is finally thrown to running position and ground is placed on conductor 311 as described hereinbefore, a circuit is closed through armature 382 and its resting contact for the right-hand winding of relay 306, which is connected to battery through the normally closed contacts controlled by armature 383, resting contact of armature 353 and said armature, pick-up conductor 164, resting contact of armature 132 and said armature, armature 116 and its resting contact, and resistance 133. Relay 306 accordingly energizes and places ground in its right-hand winding at armature 384. This ground potential is supplied through the resting contact of armature 111 of relay 101, Fig. 2, and said armature, resting contact of armature 119 and said armature, and the locking conductor 159. As a further result of its energization, relay 306 opens the locking chain circuit at armature 383 and at the same armature connects the locking chain circuit to its right-hand winding and opens its initial energizing circuit. As a still further result of the energization of relay 306, it places ground on start conductor 158 at armature 385, with the result that the sending equipment is set in operation and the switch D is operated, as hereinbefore described, to start the lamp L' flashing.

Since an interval of time has elapsed during which the sending equipment has been free to respond to its normal control in the substation, and during which any one of the several circuit breakers or other devices in the substation might have operated automatically, the despatcher cannot be certain that the flashing of the lamp L' has been brought about as a result of the starter ST being thrown in, on account of the fact that, since the switch D and the sending equipment are not and cannot be infallible, the switch D, as far as the despatcher knows, might have been set on the contacts associated with the lamp L' by mistake and in response to the operation of some device other than the starter ST. Accordingly, it is necessary for the despatcher to check the setting of the switch D. In order to do this, the despatcher closes the line circuit by means of the key K and operates the switch E through the medium of the calling device CD and in accordance with the "in" number 19 indicated by the flashing lamp L'. The operation of the switch E is the same as has been described hereinbefore and, for that reason, will not be described again. It may be pointed out, however, that since the locking chain circuit has been opened at armature 383 of relay 306, Fig. 4, the discriminating relay 103 of the relay group RG, Fig. 4, is not energized at this time. As a result, there is no battery on the conductor 163 and no circuit is closed through the wiper 234 for the left-hand winding of relay 306. Also, since relay 306 is at this time energized, and since discriminating relay 103 is not pulled up, a circuit for the lower winding of relay 102 is completed upon the deenergization of slow-acting relay 204 at the end of the rotary movement of the switch E as follows: from ground by way of the grounded locking conductor 155, resting contact of armature 218 and said armature, upper winding of relay 205, normally closed contacts controlled by armature 224, wiper 234, bank contact 240, conductor 248, working contact of armature 387 and said armature, conductor 161, resting contact of armature 118 and said armature, and the lower winding of relay 102 to battery. Relay 102 is accordingly energized over this circuit: It may be pointed out, however, that in case the wipers of the switch E had landed on some set of contacts other than the bank contacts 239 and 240 no circuit would have been closed for relay 102 on account of the fact that the remaining relays corresponding to 306, such as the relay 304, for example, are deenergized.

To continue with the description, relay 102 energizes and opens the circuit of line relay 26 of the switch D at armature 114, and at armature 113 closes a circuit for the slow to pull up relay 101, with the result that a momentary interruption is produced in the circuit of line relay 26 and is terminated when relay 101 energizes.

In the despatcher's office the momentary interruption in the circuit of line relay 26 results in the energization of relay 31 and the consequent operation of the polarized relay 60' to connect up the lamp L' and extinguish the lamp $L^2$, thereby notifying the despatcher that the signal has been correctly received.

In the substation, as a further result of the energization of relay 101, ground is placed on the cut-off conductor 160 at armature 115, with the result that a circuit is completed for the cut-off relay 305 through armature 386 and its working contact. Relay 305 accordingly energizes and performs the usual operations. As a still further result of the energization of relay 101, it opens the locking circuit of relay 306 at armature 111, whereupon relay 306 deenergizes and permits the relays associated with the sending equipment to deenergize, with the result that the switch D is released in the hereinbefore described manner. The switch E and associated circuits are restored to normal in the manner described above when the despatcher releases the key K.

The next remaining step in the placing of the motor generator MG, Fig. 5, into service is the throwing in of the circuit breaker CB. Accordingly, the despatcher again closes his line circuit at the key K and then dials the "in" number 11 assigned to the circuit breaker CB. This results in the wipers 233 and 234 of the switch E being set on the bank contacts 235 and 236. As a result of this, the switching relay 205 of the switch E pulls up in series with the left-hand winding of the sending relay 302 of the sending control circuit SC—11 over a circuit similar to the one traced hereinbefore through the left-hand winding of relay 306. Relay 302 accordingly energizes with results similar to those described in connection with relay 306, with the exception that it prepares the circuits for the sending out of the number 11 instead of the number 19. This is apparent since the second digit stop conductor 315 is connected to the first impulse stop conductor 371 at the extreme right-hand armature of relay 302 at this time instead of to the ninth impulse stop conductor 379, as is the case when relay 306 is energized.

In the despatcher's office, the switch D is now operated over conductors 18 and 19 in accordance with the number 11 received from the substation and is set upon the first set of contacts in the first level, whereupon the associated lamp (not shown) starts flashing to inform the despatcher of the position of the switch E. The despatcher accordingly gives the calling device CD a further turn, with the result that ground at armature 228 is momentarily placed on bank contact 235 through wiper 233. When this occurs, a circuit is closed over conductor 243 for the operating solenoid 402 of the circuit breaker CB. The solenoid 402 accordingly attracts the plunger 409, with the result that the circuit breaker is thrown in. The switch lever 413 makes contact with the conductor extending to the bus-bar 401, thereby finally putting the motor generator MG into operation. The member 407 is engaged by the notch in the upper portion of armature 408 of trip magnet 404 and the circuit breaker is thereby retained in its operated position after the momentary impulse of current dies away. The low resistance overload winding of the trip relay 404 is shunted around the resistance 403 in the main generator lead in order that the circuit breaker may be tripped in case of overload. The polarized relay 405 is also shunted around the resistance 403 and is provided to give reversed current protection for the motor generator MG. Accordingly, the relay 405 is poled in such a manner that it does not operate with the current flowing in the normal direction as it is now.

As a further result of the operation of the circuit breaker CB, the switch lever 412 removes ground from conductor 310, thus permitting the locked-up cut-off relay 303 to deenergize, and also places ground on conductor 309, thereby closing a circuit through the right-hand armature of cut-off relay 301, right-hand winding of the already energized relay 302, working contact of the left-hand armature of relay 302 and said armature, conductor 157, armature 127 and its working contact, armature 128 and its working contact, and the lower winding of relay 102 to battery. Relay 102 now energizes with the result that a momentary interruption is produced in the circuit of line relay 26 of the switch D in the hereinbefore described manner, and the wiper 53 is disconnected and the wiper 54 connected up, with the result that the polarized relay associated with the contacts on which the wipers are now standing is operated to extinguish the associated "out" lamp and light the associated "in" lamp.

In the substation as a further result of the energization of relay 102, Fig. 2, ground is placed on the cut-off conductor 160 through armature 115, with the result that a circuit is closed through contacts on the relay 302 for cut-off relay 301. Cut-off relay 301 thereupon energizes and closes a locking circuit for itself, at the same time disconnecting the two windings of relay 302, whereupon relay 302 deenergizes and the sending circuits restore to normal as described hereinbefore in response to the ground being removed from start conductor 158 by relay 302.

The dispatcher now releases the key K, thereby opening the circuit of the line relay 201 of the switch E and permitting the switch E and the associated circuits to be restored to normal in the hereinbefore described manner.

Referring now particularly to Fig. 5, it will be noted that the starter ST can be restored automatically in case the supply of alternating current fails. This is brought about upon the deenergization of the holding magnet 416 which, as before pointed out, is maintained energized in multiple with the resistance 419. It will also be noted that the circuit breaker CB can be restored to normal in case the load on the generator 410 becomes too great or in case the current is reversed through the generator 410, one example of which is when the alternating current supply fails, leaving the generator 410 connected with the bus-bar 401, from which it draws current as a motor. In order to further explain the operation of the remote control system, it will be assumed that the alternating current supply is interrupted long enough to permit the holding magnet 416 to deenergize. When this occurs, the armature 418 is retracted and the starter returns to its normal position, thereby disconnecting ground from the conductor 311 and permitting the locked up cut-off relay 305 to deenergize, and causing the energization of relay 308 over the following circuit: from ground by way of the lever 417 of the starter ST, conductor 312, right-hand armature of cut-off relay 307 and its resting contact, right-hand winding of relay 308, normally closed contacts controlled by the left-hand armature of relay 308, pick-up conductor 313, resting contact of armature 353 and said armature, conductor 164, resting contact of armature 132 and said armature, armature 116 and its resting contact, and resistance 133 to battery. Relay 308, upon energizing, shifts the circuit of its own right-hand winding from the pick-up conductor 313 to the locking chain conductor at its left-hand armature, and at its inner right-hand armature closes a locking circuit for itself independent of the initial energizing ground potential supplied over conductor 312. This locking circuit includes the common locking conductor 159 and armatures 111 and 119 and their resting contacts of the relays 101 and 103, respectively, of the relay group RG. A further result of the energization of relay 308 is that it prepares the necessary circuits for sending in the correct number to the substation and also places ground on the start conductor 158. The sending equipment now operates in the hereinbefore described manner to send in the "out" number 10 assigned to the starter ST to the substation.

In the substation the wipers 53 and 54 of the switch D are set on the bank contacts 55 and 56 which are the tenth set of bank contacts in the first level, and a flashing circuit is closed through wiper 53 for the "out" lamp L² and, upon the operation of the switching relay 30, a circuit is closed at armature 44 and through armature 49 and its resting contact for the alarm buzzer B to attract the attention of the despatcher.

The flashing of the "out" lamp L² indicates that the starter ST has returned to normal. In order to check this, the despatcher closes his control circuit and dials the number 10 assigned to the "out" position of the starter ST, with the result that the wipers 233 and 234 of the switch E are set on the bank contacts 241 and 242. Then, when the wiper 234 is connected up through the upper winding of the switching relay 205 at armature 218 upon the deenergization of the slow-acting relay 204 at the end of the rotary movement, a circuit is closed through wiper 234 and bank contact 242 for operating the relay 102 of the relay group RG. This circuit starts from the grounded locking conductor 155 and includes the conductor 250, a pair of contacts of relay 308, conductor 161, resting contact of armature 118 and said armature, and the lower winding of relay 102. The energization of relay 102 in this case results in a momentary interruption being produced in the circuit of line relay 26 as described hereinbefore. Relay 101 in this case, in addition to terminating the interruption produced in the circuit of line relay 26, removes ground from the locking conductor 159 at armature 111, places ground on the common cut-off conductor 160 at armature 115, whereupon the cut-off relay 307 becomes energized and closes a locking circuit for itself and disconnects relay 308. Relay 308 now deenergizes with the hereinbefore described results.

The despatcher releases the key K and permits the switch E and the associated apparatus to release in the usual manner.

In order to enable the full utility of the improved checking system to be understood, it will now be assumed that in the call just described to the despatcher's office in response to the starter ST being restored to normal, the switch D failed to land on the right set of contacts and, consequently, started flashing the wrong lamp. In this case, as before, the despatcher responds by dialling the number indicated by the flashing lamp but, since the flashing lamp is not the one corresponding to the starter ST but is some other lamp, the switch E is not set on the contacts 241 and 242 associated with the starter ST and, therefore, there is no circuit closed over conductor 250 to operate relay 102, as hereinbefore described. In that case the relays 101 and 102 are not energized and the flashing lamp continues to flash after the despatcher has completed dialling the number. Then, when the despatcher releases the key K, thereby opening the control circuit of the switch E and allowing the switch E to be restored as hereinbefore described, a circuit is closed for the slow-acting relay 105 in multiple with release magnet 210 of the switch E through armature 109 and its resting contact of relay 101, armature 120 and its resting contact, and armature 129 and its working contact. Relay 105, upon energizing, in response to the momentary impulse of current delivered to it, which impulse is terminated upon the opening of the off normal contacts 211 of the switch E, closes a circuit for the slow-acting relay 106 at armature 121. Relay 106, upon energizing, disconnects ground from conductor 162 at armature 122, thereby opening the circuit of the relays 331–334, inclusive. These relays deenergize and restore their associated circuits to normal and relay 334 connects up the sending relay 338 again to conductor 162. As a further result of the energization of relay 106, it opens the circuit of the line relay 26 of the switch D at armature 123, thereby causing the switch D to be restored to normal position in the usual manner.

Soon after the termination of the momentary impulse of current delivered to it, relay 105 deenergizes and opens the circuit of the slow-acting relay 106, which relay soon deenergizes also and again closes the circuit of line relay 26 of the switch D at armature 123, and at armature 122 again places ground on the conductor 162, whereupon the sending relay 338 commences to operate, with the result that the switch D is reoperated. Assuming that the switch D operates correctly this time, the despatcher receives the correct lamp indication and the associated relay is operated to switch the lamp circuits in response to the subsequent operation of the switch E brought about by the despatcher, as described above.

It is evident that in case the wipers 53 and 54 are set on the wrong set of contacts in response to a false operation either of the sending equipment or of the switch D itself and the lamp associated with the set of contacts on which the wipers are set is already lighted, that lamp cannot be flashed, and in that case the circuit of the upper winding of the switching relay 30 is closed to ground instead of to battery through the associated lamp. The switching relay 30 energizes over this circuit on account of the fact that the booster battery 60 is included in series with the flasher F. The energization of switching relay 30 results in the buzzer B being connected up at armature 44 in the usual manner and the despatcher's attention is attracted. Since the despatcher cannot observe a flashing lamp, he does not know in which position the switch D is set, so he merely closes the line circuit by means of his key K and then opens it. This causes the line and release relays 201 and 202 of the switch E to energize when the circuit is closed and then when line relay 201 falls back when its circuit is opened, a circuit is closed through armature 213 and its resting contact and armature 215 and its working contact for the vertical magnet 208 which accordingly raises the shaft of the switch E one step and closes the off normal contacts 211. Then, when release relay 202 deenergizes, a circuit is closed through off normal contacts 211 for the release magnet 210 to restore the switch to normal. A branch of this circuit extends as previously traced to the slow-acting relay 105 of the relay group RG, which energizes with the final result that the switch D is released and reoperated as described above.

It is obvious that, since the motor 411 is no longer operating, due to the failure of the supply current and to the consequent operation of the starter ST, the motor generator MG slows down and the generator 410 starts to operate as a motor, drawing its current from the bus-bar 401, assuming, of course, that the bus-bar 401 is supplied with direct current from some other source. In this case the direction of the current flow through the polarized relay 405 is reversed and the armature 400 is consequently tilted in the opposite direction, thereby closing a circuit through the left-hand winding of the trip magnet 404. When this occurs, the trip magnet 404 energizes and attracts the armature 408, allowing the circuit breaker CB to restore to normal. When this occurs, arm 412 removes ground from conductor 309, allowing cut-off relay 301 to deenergize and ground is placed on conductor 310, resulting in the energization of relay 304. The "out" number 12 assigned to the circuit breaker CB is now sent in in the manner described above in response to the energization of relay 304.

It will be understood, of course, that the despatcher himself can restore either the starter ST or the circuit breaker CB to normal through the medium of the switch E. Since the operations accompanying the restoring of the starter or the circuit breaker to normal are similar to the operations accompanying the throwing in of the circuit breaker or the placing of the starter in running position, they will not be described in any great detail. It is thought that it will suffice to point out that the starter ST may be restored to normal in response to a ground potential being placed on conductor 249 at bank contact 241, which results in the energization of relay 427 and the opening of the circuit of holding magnet 416 at armature 433. It is obvious that the circuit breaker CB may be thrown out by the despatcher in case he sets the switch E on the contacts 237 and 238 and brings about the energization of relay 206 to place ground on conductor 245 through wiper 233 and bank contact 237 thereby energizing the left hand winding of trip magnet 404.

A certain point in connection with the operation of the relays 5–7, inclusive, associated with the calling device CD will now be considered. The relay 5 is a cut-off relay and is provided for the purpose of opening the line circuit and closing a circuit for the lamp L in case the despatcher starts to operate the switch E at a time when a call is being sent in from the substation. It will be noted that when the release relay 27 of the switch D energizes with the relay 6 associated with the calling device CD deenergized, a circuit is closed for cut-off relay 5 as follows: from ground by way of the working contact of armature 39 and said armature, armature 46 and its resting contact, resting contact of armature 13 and said armature, and the lower winding of relay 5 to battery. Relay 5, upon energizing, disconnects relays 6 and 7 and prepares a locking circuit for itself at armature 10; opens a point in the line circuit at armature 9; and at armature 8 prepares a circuit for the lamp L. Now, in case the despatcher starts to make a call at this time, the lamp L is lighted as soon as he operates the key K to inform him that the incoming control circuit is in use. It will be noted, however, that the circuit of the lower winding of the cut-off relay 5 is opened at armature 46 upon the energization of switching relay 30 which occurs at the end of the rotary movement. This is done so as to free the outgoing control circuit to permit the despatcher to use it as a check circuit in checking the correctness of the new lamp indication.

In a system of the character set forth hereinbefore, it is desirable to make arrangements to avoid confusion in case the despatcher starts to operate the substation switch at the same time (or a little later) that a circuit breaker or other device operates automatically, with the consequent result that the despatcher's switch is operated to start the corresponding lamp to flashing. If said arrangements were not provided, the operation of both switches would occur simultaneously and the despatcher might mistake the flashing lamp resulting from the automatic operation of the device in the substation for the check signal which he desires to obtain to check the position of the substation switch. It will be remembered that when the despatcher takes the line extending from his office to the substation, battery is removed from the common pick-up conductor 164 by relay 108 of the relay group RG, which relay is controlled by release relay 202 of the switch D. This effectively prevents any of the relays, such as 306 and 308, Fig. 4, from energizing in case one of them has not already energized prior to the removal of battery from the pick-up conductor 164. However, there is always a possibility that a call has already originated and that the despatcher takes the outgoing circuit for use before the call has proceeded far enough to operate the buzzer associated with the switch D. In case, however, the call has proceeded far enough to energize the release relay 27, a circuit is closed at armature 39 through armature 46 and its resting contact and the resting contact of armature 13 and said armature for the lower winding of cut-off relay 5, which pulls up and opens the line circuit at armature 9, thereby preventing the despatcher from closing the line circuit at this time. In case the despatcher operates his key K during this interval, a circuit is closed at the contacts 4 and through the working contact of armature 8 and said armature of the lamp L, which is lighted to inform the despatcher that a call is on the way. It may so happen, however, that the call has proceeded far enough to have removed itself from under the control of the common pick-up conductor in the substation and at the same time has not yet proceeded far enough to cause the energization of release relay 27 of the switch D at the time when the despatcher operates his key K. In this case the operation of the relays 6 and 7 is as described hereinbefore, and the line circuit is closed and the despatcher can proceed with the call. The circuit of the lower winding of relay 5, however, is such that it is not disconnected from the switch D until after the slow-acting relay 7 has pulled up and been disconnected at armature 12 by relay 6 and has then fallen back, at which time it finally disconnects the lower winding of relay 5 at armature 15. This interval during which the lower winding of relay 5 remains connected after the key K is operated is sufficiently long to permit of any call which is already started to proceed far enough to operate the cut-off relay 5, with the result that the line circuit is opened and the busy lamp L is lighted.

When such a coincidence as this occurs, the incoming call is interrupted before it is finished, owing to the fact that the circuits are arranged in such a manner that in order to break down a connection set up through the switch D and cause it to be set again, it is only necessary for the despatcher to close his line circuit and then open it. This is in effect what happens at this time on account of the fact that the despatcher closes the line circuit which is then opened automatically, as pointed out above. The switch D is released at this time in response to the operation of relays 105 and 106 of the relay group RG which occurs as hereinbefore described. The despatcher is informed by the busy lamp L, however, of what has happened and he merely waits a few seconds for the switch D to be reoperated after the relay 106 of the relay group RG has again deenergized.

What is claimed is:

1. In a remote control system, a control station and a distant substation, a power switching device at the substation, two lamps at the control station one of which is always lighted to indicate the position of said switching device, a selecting switch at the substation controlled by the despatcher at the control station to prepare for a change in the position of said switching device, other switching devices at the substation and signals corresponding thereto at the control station, means including a checking circuit and a second selective switch controlled thereover for flashing the dark lamp corresponding to the switching device whose position is to be changed, means whereby the despatcher can further operate said first selecting switch to change the position of such switching device, said second selective switch being held in operated position meanwhile, and means controlled by way of said second selective switch responsive to the change in position of said switching device for causing the flashing lamp to be lighted permanently and for causing the associated lighted lamp to be extinguished.

2. In a remote control system, a control station and a distant substation, a plurality of switching devices at the substation selectively controlled by a control switch operated by the despatcher at the control station over a single circuit, a checking circuit, signalling means at the control station selectively controlled over said checking circuit in response to the operation of the control switch to give a check on any selective operation designed to operate a switching device before such switching device is actually operated, means in said control switch operable by the despatcher over said control circuit to operate the desired switching device while maintaining the checking circuit established, and means responsive to the operation of such switching device for altering said signalling means to indicate the new position of the switching device.

3. In a remote control system, a control station and a distant substation, switching devices at the substation under control of the despatcher at the control station, signals at the control station always indicating the position of said switching devices, means controlled by the despatcher for preparing a circuit to operate any desired switching device, means comprising another circuit for changing the indication of the corresponding signal to advise the despatcher as to which switching device has been prepared for operation, to check the accuracy of the preparations, means controlled by the despatcher for closing the prepared switching device operating circuit without affecting said signal indication, and means responsive to the operation of the switching device for again changing the signal.

4. In a remote control system, a control station and a distant substation, switching devices at the substation, switching device operating mechanism controlled by the despatcher at the control station in two stages, a selecting stage and a final operating stage, a signal at the control station, a circuit established responsive to the operation of said mechanism in its selective stage for operating said signal to notify the despatcher as to the accuracy of the selective operation, means operated over said established circuit when the switching device responds to the operation of said mechanism in its final stage to change said signal to indicate the new position of the operated switching device.

5. In a remote control system, a control station and a switching station, a plurality of switching devices in said switching station, a control circuit between the stations, a control switch in the switching station, a plurality of indicating devices and a checking switch for controlling the same at the control station, a second circuit between said stations, means for operating the control switch from the control station over the control circuit to select one of said switching devices, means responsive to said selection for operating said checking switch over the second circuit to indicate on the indicating device the position of the control switch and for retaining the checking switch in its operated position, means in the control switch responsive to a reoperation of the control switch operating means for changing the position of the switching device, and means controlled through the operated checking switch for automatically changing the indicating device to correspond to the new position of said switching device.

6. In a remote control system, a control station and a remote substation, a control switch in the substation having two stages, a selecting stage and a final operating stage, a plurality of switching devices at said substation adapted to be selected and operated by said control switch, a plurality of indicating devices at the control station, one for each switching device, a checking switch at the control station, a signal circuit established in response to an operation of the control switch in its selective stage, means for operating said checking switch over said established circuit to check the accuracy of said selection, means in said control switch operable by the dispatcher for controlling the final operation of the switching device, and means controlled by the dispatcher for either retaining the checking switch in its operated position until the switching operation is completed or releasing it before the switching operation is completed.

7. In a remote control system, a control station and a switching station, a control switch and a plurality of switching devices in the switching station, a plurality of signals and a checking switch at the control station, a control circuit and a checking circuit between the stations, means at the control station for operating said control switch over the control circuit to select one of said switching devices, means in the switching station responsive to said selection for operating said checking switch over the checking circuit to select the signal corresponding to the selected switching device, means for holding the checking switch in its operated position until the control switch is released, and means for releasing both switches.

8. In a remote control system, a control switch having a plurality of positions, a circuit for said switch, means controlled over said circuit for setting said switch in a desired position to close another circuit, means controlled thereover in response to said operation of said switch for indicating the actual position of said switch, means for maintaining said second circuit closed after the position of said switch has been indicated, and means controlled over the first mentioned circuit for opening said other circuit.

9. The method of controlling and supervising a device from a remote point, which consists in positioning a pair of contacts to select a desired device; positioning a second pair of contacts to check the accuracy of said selection; operating the selected device thru said first positioned contacts while maintaining said second contacts in said position, and then supervising the device thru said second positioned contacts.

10. In a remote control system, a plurality of switching devices, means including a selective switch for selecting a desired one of said devices, signals associated with said devices, means including a checking switch operated in response to said selection for checking the accuracy of said selection, means for operating said selected device while maintaining said checking switch operated, and means operated by said device to alter said signals thru said operated checking switch to indicate the operation.

11. In a remote control system, a plurality of switching devices, a selecting switch, means for transmitting a code of impulses to said switch to position it to select a particular one of said devices, signals associated with said devices, a checking switch, means responsive to the positioning of selecting switch to transmit a code of impulses to said checking switch to position it on a particular signal to check the position of said selecting means, means including a relay energized from said selecting switch for maintaining said checking switch in said operated position, means responsive to another impulse transmitted to said selecting switch for operating the selected device, and means responsive to the operation of said device to transmit another impulse to said checking switch to operate it to alter said particular signal to correspond with the operation of said device.

12. In a remote control system, a plurality of devices each having a plurality of positions a set of signals for each device comprising a signal for each position of the device, means for selecting a device to change its position, an automatic switch operated in response to said selection to intermittently operate the signal indicating the position into which the device is to be moved without affecting the operation of the signal which indicates the position in which the device stands, means for holding the automatic switch in its operated position, means for then changing the position of the device, and means responsive to said change to control said automatic switch to steadily operate the signal indicating the position into which the device moves and to retire the signal indicating its old position.

13. In a remote control system, a control switch having a plurality of positions, a circuit for said switch, means controlled over said circuit for setting said switch in a desired position, a second circuit, a sender switch, means controlled from said control switch in said position to start said sender to close said second circuit, means controlled over said second circuit by said sender to indicate the actual position of said control switch, means for maintaining said sender operated to maintain said second circuit closed after the position of said switch has been indicated, and means controlled over the first mentioned circuit for restoring said sender to open said second circuit.

14. In a remote control system, a control switch having a plurality of positions, a circuit for said switch, means controlled over said circuit for setting said switch in a desired position, a second circuit, a sender switch, means controlled from said control switch in said position to start said sender to close said second circuit, a plurality of signals, a second switch operated over said second circuit by said sender to select a particular signal to indicate the actual position of said first switch, means for maintaining said second circuit closed to hold said second switch operated after said indication has been given, and means controlled over the first mentioned circuit for releasing said second switch.

15. In a remote control system, a control switch having a plurality of positions, a circuit for said switch, means controlled over said circuit for setting said switch in a desired position, a second circuit, a sender switch, means controlled from said control switch in said position to start said sender to close said second circuit, a plurality of signals, a second switch operated over said second circuit by said sender to select a particular signal to indicate the actual position of said first switch, means for maintaining said second circuit closed to hold said second switch operated after said indication has been given, and means controlled over said first mentioned circuit for releasing said sender, second switch and second circuit.

16. In a remote control system, a plurality of switching devices, signals always indicating the position of said switching devices, means controlled by the dispatcher for preparing a circuit to operate any desired switching device, means controlled over said prepared circuit to alter said signals to indicate which device has been prepared for operation and to prepare a signal changing circuit, means for maintaining said signal circuit prepared after said indication has been given, means for operating said device over said prepared operating circuit, and means operated by said device to change said signal over said prepared signal changing circuit.

17. In a remote control system, a plurality of switching devices, signals always indicating the position of said switching devices, means controlled by the dispatcher for preparing a circuit to operate any desired switching device, means controlled over said prepared circuit to alter said signals to indicate which device has been prepared for operation and to prepare a signal changing circuit, means for maintaining said signal circuit prepared after said indication has been given, means operated over said operating circuit to start the operation of said device, and means for releasing said prepared signal circuit after the operation of said device has been started and before it has been completed, without affecting its operation.

18. In a remote control system, a plurality of switching devices, signals always indicating the position of said switching devices, means controlled by the dispatcher for preparing a circuit to operate any desired switching device, means controlled over said prepared circuit to alter said signals to indicate which device has been prepared for operation and to prepare a signal changing circuit, means for maintaining said signal circuit prepared after said indication has been given, means for releasing said prepared circuit without operating either said prepared device or signal.

Signed at Chicago, Illinois, this 28th day of April, 1923.

RODNEY G. RICHARDSON.

Signed at Chicago, Illinois, this 28th day of April, 1923.

JOHN I. BELLAMY.